United States Patent [19]

Kendall, Jr. et al.

[11] Patent Number: 4,960,351
[45] Date of Patent: Oct. 2, 1990

[54] SHELL FORMING SYSTEM

[75] Inventors: James M. Kendall, Jr., Pasadena; Taylor G. Wang, Glendale; Daniel D. Elleman, San Marino, all of Calif.

[73] Assignee: California Institute of Technology, Pasadena, Calif.

[21] Appl. No.: 922,899

[22] Filed: Oct. 24, 1986

Related U.S. Application Data

[63] Continuation-in-part of Ser. No. 640,928, Aug. 15, 1984, Pat. No. 4,643,854, which is a continuation-in-part of Ser. No. 371,662, Apr. 26, 1982, abandoned.

[51] Int. Cl.$^5$ .................................................. B29B 9/00
[52] U.S. Cl. ......................................... 425/6; 65/21.4; 425/174.8 E
[58] Field of Search ............... 425/5, 6, 7, 174.8 E, 425/174.8 R; 264/12, 13, 574, 82; 239/8, 423, 424; 222/190, 420; 65/21.4; 428/402.2, 402.21, 406, 407; 521/76

[56] References Cited

U.S. PATENT DOCUMENTS

| | | | |
|---|---|---|---|
| 4,163,637 | 8/1979 | Hendricks | 425/6 |
| 4,218,416 | 8/1980 | Gokcen | 264/167 |
| 4,238,435 | 12/1980 | Liebisch | 264/167 |
| 4,279,632 | 7/1981 | Frosch et al. | 65/21.4 |
| 4,303,431 | 12/1981 | Torobin | 264/12 |
| 4,333,906 | 6/1982 | Porter et al. | 264/167 |
| 4,344,787 | 8/1982 | Wang et al. | 65/21.4 |
| 4,608,212 | 8/1986 | Isner | 264/167 |

Primary Examiner—Jay H. Woo
Assistant Examiner—C. Scott Bushey
Attorney, Agent, or Firm—Freilich Hornbaker & Rosen

[57] ABSTRACT

Hollow shells of high uniformity are formed by emitting liquid through an outer nozzle and gas through an inner nozzle, to form a hollow extrusion, by flowing the gas at a velocity between about 1.3 and 10 times the liquid velocity. The natural breakup rate of the extrusion can be increased to decrease shell size by applying periodic perturbations to one of the materials prior to exiting the nozzles, to a nozzle, or to the extrusion.

2 Claims, 2 Drawing Sheets

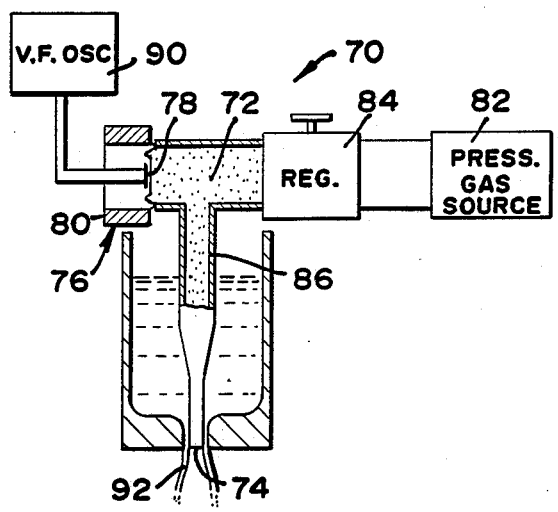
FIG. 7
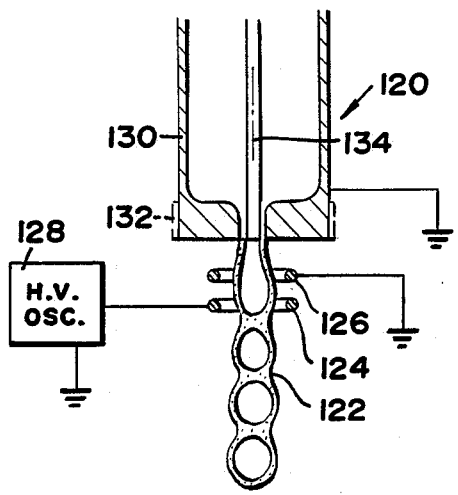
FIG. 8
FIG. 10
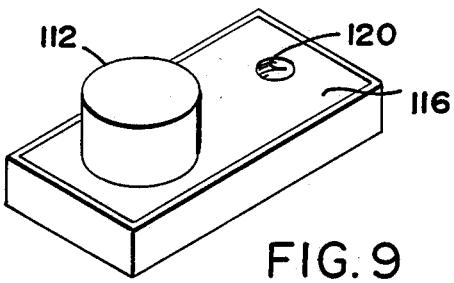
FIG. 9

SHELL FORMING SYSTEM

ORIGIN OF THE INVENTION

Invention described herein was made in the performance of work under a NASA Contract and is subject to the provisions of Section 305 of the National Aeronautics and Space Act of 1958, Public Law 5-568 (72 Stat. 435; 42 USC 2457).

This is a continuation-in-part and division of U.S. Pat. Application Ser. No. 640,928 filed Aug. 15, 1984, now U.S. Pat. No. 4,643,854, which is a continuation-in-part of U.S. Pat. Application Ser. No. 371,662 filed Apr. 26, 1982, now abandoned.

BACKGROUND OF THE INVENTION

Gas-filled spherical shells can be useful in a variety of applications. For example, very accurately formed shells are required as targets in inertial confinement fusion reactors. A common technique for producing hollow spheres is by the use of concentric nozzles, with gas flowing out of the inner nozzle and molten material flowing through the annular space between the inner and outer nozzles. Various pinch-off mechanisms have been suggested for inducing periodic pinch off of the gas-filled extrusion emerging from the concentric nozzles, as a means for producing hollow spheres of uniform size. For example, it has been proposed to apply pulses of air transverse to the gas-filled extrusion, or to apply vibrations to the nozzle or to the extrusion emerging from the nozzle to pinch off and break up the extrusion. A simple apparatus and technique which could produce hollow spheres of great uniformity in size and wall thickness, would be of considerable value. It would also be valuable if the apparatus and technique facilitated fine adjustment of the size of the uniform shells.

SUMMARY OF THE INVENTION

In accordance with one embodiment of the present invention, a relatively simple shell-forming apparatus and method are provided which produce gas-filled shells of high uniformity. The apparatus includes inner and outer nozzles which are largely concentric, a means for flowing a liquid through the annular space between the nozzles, and a means for flowing a gas through the inner nozzle, in order to produce a hollow pipe-like extrusion emanating from the nozzles. The gas is flowed at a higher velocity through the tip of the inner nozzle, than the velocity of liquid at the tip of the outer nozzle, and preferably with a velocity between about 1.3 and 10 times as great. It is found that this results in automatic or spontaneous pinch-off of the hollow extrusion into hollow spheres of highly uniform diameter and mass (i.e., average wall thickness), without the need for any additional pinch-off apparatus or technique.

The inner nozzle may extend slightly beyond the outer one, and the outer nozzle may be formed with a protruding lip in order to provide uniform wetting at the tip of the outer nozzle to enhance uniformity in the breakup of the hollow liquid extrusion.

The size of the shells can be altered, without changing the sizes of the nozzles, by applying periodic perturbations to the liquid and/or gas. In the absence of such perturbations the hollow extrusion breaks up into shells at a uniform "natural" frequency. By applying perturbations at a somewhat higher frequency than the natural breakup frequency, the extrusion can be made to break up at a somewhat higher frequency to produce somewhat smaller shells. The perturbations can be pressure pulses applied to the gas or liquid material at a location upstream of the nozzle tips. The perturbations can be in the form of acoustic energy or an electrostatic field applied to the extrusion emanating from the nozzle at a location prior to breakup of the extrusion. The perturbations can be vibrations applied to a nozzle.

The novel features of the invention are set forth with particularity in the appended claims. The invention will be best understood from the following description when read in conjunction with the accompanying drawings.

BRIEF DESCRIPTION OF THE DRAWINGS

FIG. 7 is a partial sectional view of a system constructed in accordance with another embodiment of the invention.

FIG. 8 is a partial sectional view of a system constructed in accordance with another embodiment of the invention.

FIG. 9 is a perspective view of a portion of the system of FIG. 8.

FIG. 10 is a partial sectional view of a system constructed in accordance with another embodiment of the invention.

DESCRIPTION OF THE PREFERRED EMBODIMENTS

Figure 1:
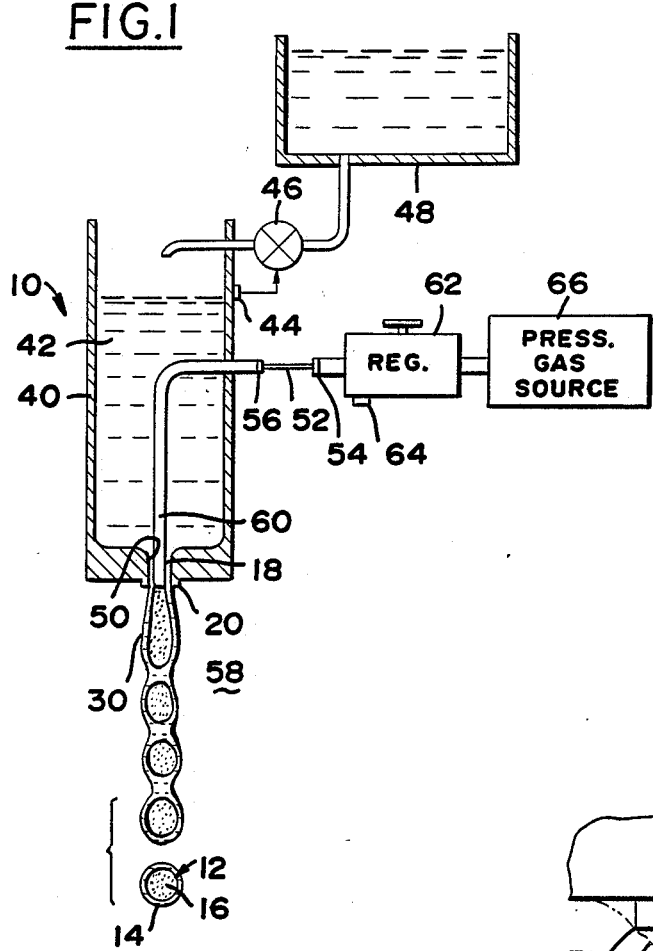
FIG. 1 is a sectional view of a shell-forming system constructed in accordance with the present invention.

FIG. 1 illustrates a system 10 which forms spherical shells 12 that each include a shell wall 14 which is initially liquid and which surrounds a gas core 16. The shells are formed by flowing materials through a nozzle assembly which includes a pair of concentric nozzles 18, 20, with a gas passing out of the inner nozzle 18 and a liquid passing out of the outer nozzle 20. The liquid may be at an elevated temperature such as metal or glass in a molten state, so that the walls of the spherical shells 12 will harden as the shells fall through a tower or other cooling arrangement. A major object in the construction and operation of the system is to generate hollow spheres 12 of high uniformity, so that the diameter and average wall thickness (i.e., mass) of the shells are all very close to the same value. In another application, the system is used to dispense uniform droplets (which happen to be gas-filled) of liquid.

In accordance with the present invention, it is found that shells 12 of uniform size and mass can be formed by controlling the relative velocities of the liquid and gaseous materials at the locations where they issue from their respective nozzles, and in particular by controlling the velocity of the gaseous material so it is higher than that of the liquid material. The velocity of the gas at the downstream end of its nozzle 18 is preferably about three times that of the liquid at the downstream end of its nozzle 20, that is, the velocity of the gas is preferably between 1.5 times and 6 times that of the liquid, for the system to work well. It should be between about 1.2 and 10 times the liquid velocity in order for the system to work at all.

Figure 3:
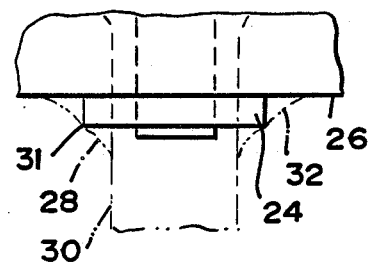
FIG. 3 is a partial side elevation view of the nozzle of FIG. 2.
Figure 2:
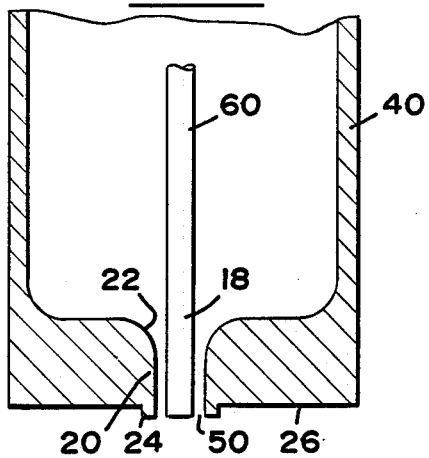
FIG. 2 is a partial sectional view of the nozzle in the system of FIG. 1.

Uniformity in shell formation is enhanced by constructing the apparatus to operate in a uniform manner. The inside walls 22 (FIG. 2) of the liquid nozzle are gradually curved to direct the liquid out of the nozzle with minimum turbulence. The tip of the outer nozzle 10 may include a lip 24 which projects in front of a surrounding depressed region 26. The lip is used to provide a more uniform meniscus of liquid around the tip of the nozzle to minimize nonuniform effects on the hollow extrusion. As shown in FIG. 3, a meniscus 28 of liquid has been found to frequently form between the lip 24 and the gas-filled liquid extrusion 30 that issues from the nozzle. If a wide flat area surrounded the tip of the nozzle 20, then the size of the meniscus might vary at different locations around the nozzle tip and unsymmetrically affect the extrusion 30. A narrow lip 24 of a wall thickness E (FIG. 4) less than the inside radius of the nozzle 20, but more than one-tenth the radius, avoids this. It may be noted that an additional meniscus 32 may sometimes form between the depressed area 26 and the lip 24, but any irregularity in this auxiliary meniscus 32 has a minimal effect on the extrusion 30, especially since the outer edge 31 of the lip has a sharp corner. The lip is especially useful for liquids that wet the nozzle material.

The uniformity of shell formation is enhanced by avoiding disturbances to the system. In particular, transverse jets of air applied to one side of the extrusion to pinch it off, such as those used in a bubble blowing method shown in U.S. Pat. No. 4,303,431, are preferably avoided.

Figure 4:
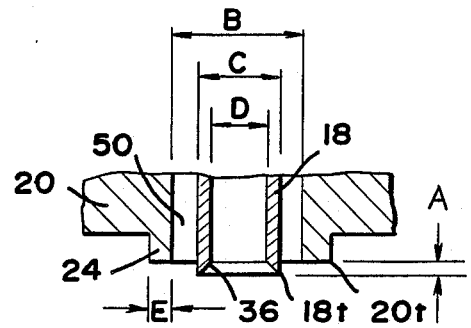
FIG. 4 is a partial sectional view of the nozzle of FIG. 3.

The inner nozzle 18 through which gas emerges is a straight tube of constant diameter. Its tip preferably has an outside diameter at least one-third the inside diameter of the outer nozzle. As shown in FIG. 4, the downstream end or tip 18t of the inner nozzle 18 projects a distance A below the tip at 20t of the liquid nozzle. Such slight protrusion of less than one-half the inside radius of the nozzle 20 but more than one-tenth the clearance 50 between nozzles, has been found to provide more regular formation of shells. The protrusion A is small, as the tip of the two nozzles should be close to being even with one another. However, it should be noted that a gas stream emitted far upstream from the tip of the outer nozzle tends to center itself, for small diameter outer nozzles (e.g., under 1 mm). It has also been found that it is preferable to taper the inside of the gas nozzle 18 near its tip, at the location 36, so that the walls of the nozzle 18 are progressively thinner at positions progressively nearer the extreme tip. Such tapering has been found to produce greater uniformity in the shells. It is noted that such tapering has not been used for very small nozzles in applicant's tests, because of the difficulty of fabrication.

The system 10 of FIG. 1 includes a container 40 that holds a quantity of the liquid 42 which is to form the walls of the shells. A predetermined height of the liquid is maintained above the tip of the liquid nozzle 20, in order to maintain a predetermined velocity of liquid out of the nozzle. A sensor 44 senses when the level of the liquid falls below a predetermined level, to operate a valve 46 that passes additional liquid from a supply 48 into the container 40. An alternate scheme has also been used, wherein gas at a predetermined pressure has been maintained against a supply at a low height above the nozzle. In either case, the velocity flow rate can be calibrated by noting the volumetric flow of liquid out of the annular space 50 that lies within the liquid nozzle and outside of the gas nozzle, for a given height of liquid or pressure of gas behind a liquid supply.

The velocity of gas flowing out of the inner nozzle 18 is controlled by passing the gas through a flow-resistant tube 52, which is sometimes referred to as a capillary tube, and by maintaining a predetermined pressure difference between the upstream and downstream ends 54, 56 of the tube. The pressure at the downstream end 56 of the tube is very close to the ambient pressure existing in the area 58 immediately outside the nozzles. This is because the liquid in the hollow stream 30 issuing from the nozzle cannot withstand an appreciable pressure difference between the gas pressure within it and the ambient gas pressure. Also, there is very little pressure drop through the large tube 60 leading from the capillary tube to the nozzle 18. The pressure at the upstream end 54 of the flow-resistant tube 52 is maintained at a predetermined level above the ambient pressure by a pressure regulator 62 which compares the pressure at the tube end 54 with the pressure at a regulator inlet 64 that is open to the ambient pressure. The pressured gas is obtained from a high-pressure source 66, with the gas passing through the regulator 62 before reaching the flow-resistant tube 52. Where the shells 12 are to contain gas under a high pressure, the area 58 outside the nozzle is enclosed to contain a high pressure, and the regulator inlet 64 is coupled to that environment at 58.

A number of experiments have been conducted to form hollow gas-filled shells in the manner described above. In one experiment, the outer nozzle 20 (FIG. 4) had an inside diameter B of 4.0 mm, and the inner nozzle 18 had an outside diameter of C of 2.5 mm and a constant inside diameter D of about 2 mm which tapered near its tip at 36. Thus, the clearance (0.75 mm) between inner and outer nozzles was about 20% of the diameter of the outer nozzle. A liquid composed of water was flowed out of the annular space at a velocity of 1.09 meters per second, while air was flowed out of the inner nozzle 18 at a velocity 4.2 times as great. The extrusion or flow stream, had the general appearance shown at 30 in FIG. 1, and underwent axisymmetric oscillations that appeared to cause even pinch-off of the extrusion. With the flow rates maintained constant within 0.1%, the frequency of shell formation was constant within 0.1% and the weights of the shells were held to approximately the same uniformity. At a higher flow rate of liquid and gas, with the liquid at 4.75 meters per second and gas velocity at 3.0 times as great, substantially the same results occured, although capillary waves could be observed on the outer surface of the liquid stream.

Figure 5:
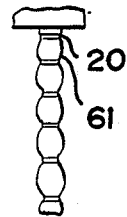
FIG. 5 is a side elevation view of an extrusion obtained with the system of FIG. 1 at a high gas-to-liquid velocity ratio.
Figure 6:
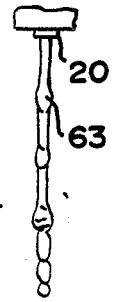
FIG. 6 is a view similar to that of FIG. 5, but obtained at a low gas-to-liquid ratio.

At ratios of gas-to-liquid flow much higher than 10, the liquid stream did not break into separately pinched-off bubbles. For example, at a gas-to-liquid velocity ratio of 12.6, a continuous stream was formed with partially formed hollow spheres connected together. Such a stream is shown at 61 in FIG. 5. At a low gas-to-liquid flow rate of 1.4, the largely spherical shells were spaced about 5 diameters apart, with a cylindrical stream connecting successive shells, as shown at 63 in FIG. 6. The shells did eventually completely pinch off and break free of the cylinders of liquid flow in front of and behind them, but were not as uniform in size as at a flow ratio of about 3.

In the experiments, it was found that the viscosity of the liquid did not significantly affect the results. In particular, the same effects were achieved for water, as for glycerine which had about 500 times the viscosity of water. The gas composition also did not appear to affect the results, since the gases Freon-12, nitrogen, and helium were also utilized, which span a density range of 30 to 1. Surface tension also did not appear to significantly affect the results, since the results were about the same with distilled water, as with distilled water in which a surfactant (Kodak Photo-Flow) was added. The addition of the surfactant decreased the frequency of formation by about 1% and increased the diameter of the spheres by about 33%. As a general observation, the addition of surfactant improved the apparent quality of the shells, at a station about two meters below the nozzle exit. The 4.0 mm nozzle was operated with gas tubes whose diameters were as small as 1.2 mm. Similar operations as described above were obtained, with the wall thickness of the shells changing according to the clearance between the inner and outer nozzles. In all cases, the shells had outside diameters of about twice the outer nozzle diameter. Fluid nozzles of various diameters ranging from 0.2 mm to 4.0 mm were used. In all of these trials, good shell formation was obtained for the gas-to-liquid velocities described above (i.e., gas velocity greater than liquid velocity, and preferably between 1.5 and 6 times as great).

In the experiments, the velocity of the gas (air) was measured by use of a wet test meter which measures the volumetric flow rate of gas. The pressure of the gas is very close to atmospheric at all locations. It is known that at a small gas flow rate of less than about 10 meters per second, gas is virtually incompressable, where there is no heating of the gas. The velocity of the liquid was measured by measuring the volumetric flow rate.

In one series of tests using the above-described 4.0 mm outside nozzle and 2.5 mm inside nozzle, the liquid velocity was maintained at 1.09 meters per second (m/sec) and the gas was flowed at rates that varied from 1.4 m/sec to 12.6 m/sec (1.3 to 11.6 times liquid velocity), including at a middle velocity of 4.2 m/sec. At a gas velocity of 1.4 m/sec, the stream did break up into shells. It was found that at 1.4 m/sec shells of uniform size were obtained, but at slightly less than 1.4 m/sec velocity the stream did not break up into shells. Shells of uniform size were obtained at greater gas velocities up to about 11 m/sec (10 times liquid velocity). Above a gas velocity of about 11 m/sec the gas-filled stream was formed of a series of connected bubbles. It was found that above an 11 m/sec gas velocity, the bubbles broke before they could separate into individual shells.

Additional tests have been made using nozzle assemblies wherein the inside diameter of the outer nozzle varied between 0.25 mm and 4.0 mm, using a variety of liquids including water, tin, aluminum, gold, lead, and certain plastics. In these tests, the gas velocity was maintained at about three times liquid velocity and very uniform shells were produced. The liquid velocity was a few meters per second.

Applicants did not attempt to use nozzle assemblies larger than 4 mm because they were not able to cool the larger shells so the shells would harden before they touched a solid surface. The smaller shells cool faster so they solidify before they fall onto the bottom of a cooling chamber. In an outer space (zero gravity) environment, larger shells should be readily produceable.

Applicant's analysis of the operation of such nozzle assemblies shows that, besides the need to maintain a gas velocity between about 1.3 and 10 times the liquid flow rate, the velocity of liquid emerging from the outer nozzle must exceed a certain rate. The liquid velocity must exceed the velocity of surface tension waves in the liquid material which forms the gas-filled pipe extrusion extruded from the nozzle. Otherwise, the first bubble formed immediately outside the nozzle will cling to the nozzle and grow in diameter until it breaks. The surface tension wave velocity $V_w$ is a function of the thickness $D'$ of the liquid in the gas-filled extrusion (usually the clearance between the inside of the outer nozzle and the outside of the inner nozzle), the density $R$ of the liquid, and the surface tension $S$ of the liquid. They are related by the following equation:

$$V_w = \frac{2S^{\frac{1}{2}}}{RD'}$$

where Vw is approximately the minimum liquid velocity (e.g., cm/sec), S is the surface tension (e.g., dynes/cm), R is density (e.g., gm/cm$^3$), and D' is the clearance between nozzles (e.g., cm). The density R of water is 1 gm/cm$^3$ The surface tension S of pure water is 70 dynes/cm. The nozzle assembly described above had a 4 mm inside diameter for the outer nozzle and a 2.5 mm outside diameter for the inner nozzle, resulting in a clearance of 0.75 mm. For pure water, the minimum liquid speed would be about 43 cm/sec. The ratio of surface tension S to density R is about the same for water, tin, aluminum, gold and lead. Thus, for any nozzle having an outer nozzle diameter of 4 mm or less (which is about the greatest diameter shells that can be cooled to a solid before falling onto a support, with presently available equipment) and a clearance between inner and outer nozzle of about 20% of the outer nozzle diameter, the liquid velocity must be at least about 43 cm per second. For variable nozzle sizes under these circumstances, the liquid velocity should be at least about 11/F cm/sec where F is the outer nozzle diameter in centimeters.

Although the above-described system was initially developed for applications where gas-filled shells are required, it has great value where the precise dispensing of solid, liquid, or gaseous material is required. The uniformity of droplet mass of about 0.1% or better which has been achieved with a relatively simple system, is much better than has been achieved in simple systems in which solely liquid droplets were formed by the breaking of a solely liquid stream.

Uniform liquid dispersing by a simple system can be useful in a variety of applications, such as in dispensing ink droplets in ink jet printing, dispensing medicine, and dispensing glue. Solid material can be dispensed by using the solidified shells. Gas can be dispensed by allowing liquid shells to break and draining away the liquid.

The great uniformity in hollow droplet or shell size arises from the hollow extrusion breaking up into shells at a very uniform frequency. In the above-described test using a 4.0 mm outside nozzle and 2.5 mm inside nozzle with water flowing at 1.09 meters per second and gas flowing at about 4.2 meters per second, the extrusion pinched into shells at a rate of about 90 per second, or in other words at a frequency of about 90 Hz. The breakup frequency varies with the −1.5 power of the nozzle size, and was about 8,000 Hz for a liquid nozzle of 0.2 mm inside diameter. In further experiments, it was found that the break up rate could be increased by applying perturbations to the system. Perturbations of a frequency somewhat greater than the natural break up frequency of the extrusion (break up frequency in the absence of perturbations) caused the extrusion to break up at a higher frequency to produce smaller shells.

In one group of experiments, equipment of the type shown at 70 in FIG. 7 was used to apply perturbations to the gas 72 upstream of the gas nozzle tip 74. This system includes an acoustic transducer 76 such as of the loudspeaker type which includes a voice coil 78 that moves with respect to a magnet 80. Pressured gas from a source 82 flows through a regulator 84 to a gas tube 86. The voice coil 78 produces variations in the pressure of the gas, at a rate controlled by a variable frequency oscillator 90. The natural break up frequency of the extrusion 92 may first be determined, with the oscillator 90 not energized. Then, the oscillator 90 can be energized at a frequency between about 100% and 130% of the natural break up frequency, a progressively higher frequency within this range resulting in progressively smaller shells. At a perturbation frequency of about 130% of the natural break up frequency, the shell size is about 20% smaller. It may be noted that the shell size is also controlled to some extent by the airflow velocity and that a smaller airflow velocity (resulting in a smaller ratio of gas to liquid velocity) results in creation of somewhat smaller shells. It was found that when the frequency of the perturbations exceeded about 130% of the natural break up frequency, breakup became erratic. Perturbations below 100% of the natural break up frequency did not produce larger shells, but either had no effect or tended to produce erratic breakup. The intensity of the acoustic energy was determined by first applying a high intensity, which caused erratic behavior in that the extrusion broke up into broken shells. The sound intensity was decreased to a level at which the extrusion broke up into complete shells. The application of perturbations to the liquid material would be expected to cause similar results.

The size of the shells have also been decreased by applying perturbations to the extrusion after it is emitted from the nozzles but before breakup. FIG. 8 illustrates a system 100 which includes walls 102 forming a substantially closed chamber 104 along the path 106 of the extrusion 108 that is emitted from the nozzle assembly 110. An acoustic transducer 112 is energized by an oscillator 114 to create acoustic waves within the chamber 114, in a direction largely perpendicular to the path 106 of the extrusion. These acoustic perturbations are of a frequency between about 100% and 130% of the natural break up frequency of the extrusion, and result in a more frequent breakup of the extrusion resulting in smaller shells (smaller outside diameter and smaller in weight). It has been found that shells of up to about 6% smaller outside diameter can be produced by this technique. Frequencies above about 130% of the natural break up frequency cause erratic breakup, while a frequency below 100% of the natural frequency does not produce larger shells. The intensity is adjusted in the same manner as for the apparatus of FIG. 7. The chamber 102 is formed by a pair of plates 116, 118 sealed around their edges, and having holes 120 that pass the extrusion but closely surround it. For an outer nozzle diameter of 4 mm producing shells of about 7.2 mm, the holes 120 had a diameter of about 8 mm.

FIG. 10 illustrates another system 120 which applies perturbations electrostatically to the extrusion 122. Applicant has used a system of this type, using a pair of ring-shaped electrodes 124, 126 which surround the extrusion. The electrode 124 is connected to a high-voltage oscillator 128 which produces voltages of about 10,000V (and a frequency such as 90 Hz to 117 Hz). The other ring 126 is grounded, as is the outer nozzle 130. The oscillator 128 was driven at frequencies above the natural break up frequency of the extrusion, and produced smaller shells. However, this technique was found difficult to use because of the occasional creation of sparks. The second ring 126 could be eliminated, but was used to minimize the possibility of generating a high voltage in the nozzle 130 and associated equipment.

Perturbations can also be applied to the nozzles, as by a piezoelectric transducer indicated at 132 in FIG. 10 which symmetrically contracts and allows expansion of the outer nozzle about its axis 134. However, the effective perturbations are those which are symmetric to the path 106 of the extrusion, and it is more difficult to symmetrically vibrate a nozzle than to use the methods described above.

Thus, the invention provides a system for producing gas-filled shells of uniform diameter and wall thickness in a relatively simple manner, and for dispensing material with a high level of uniformity. This is accomplished by passing gas through an inner nozzle and liquid through the annular space between the inner nozzle and an outer nozzle, wherein the velocity of the gas is carefully controlled to be between about 1.3 and 10 times that of the liquid. The size of the shells can be changed by applying perturbations to the gaseous and/or liquid material.

Although particular embodiments of the invention have been described and illustrated herein, it is recognized that modifications and variations may readily occur to those skilled in the art and consequently it is intended to cover such modifications and equivalents.

What is claimed is:

1. Shell forming apparatus comprising:
   means for flowing a gaseous material and a liquid material along substantially concentric merging paths which form a gas-filled liquid extrusion, including flowing the gaseous material between about 1.3 and about 10 times the liquid material velocity, and flowing the liquid material at a velocity at least about equal to the surface wave velocity of the liquid material, to thereby enable the extrusion to spontaneously break up into hollow shells at a predetermined rate in the absence of perturbations;
   means for applying perturbations to one of said materials upstream of said liquid extrusion, at a frequency greater than said predetermined rate, whereby to produce smaller shells.

2. the apparatus described in claim 1 wherein:
   said frequency is between about 100% and 130% of said predetermined rate.

* * * * *